(12) United States Patent
Kübler et al.

(10) Patent No.: US 7,753,446 B2
(45) Date of Patent: Jul. 13, 2010

(54) ADJUSTABLE SEAT

(75) Inventors: Markus-Claus Kübler, Schoemberg (DE); Joerg Dittus, Freiberg Am Neckar (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/367,712

(22) Filed: Feb. 9, 2009

(65) Prior Publication Data
US 2009/0200848 A1    Aug. 13, 2009

(30) Foreign Application Priority Data
Feb. 7, 2008    (DE) ............... 10 2008 008 924

(51) Int. Cl.
A47C 3/00    (2006.01)

(52) U.S. Cl. .............................. 297/284.11

(58) Field of Classification Search ........... 297/284.11, 297/284.1
See application file for complete search history.

(56) References Cited

U.S. PATENT DOCUMENTS

| | | | |
|---|---|---|---|
| 3,883,173 A | | 5/1975 | Shephard et al. |
| 4,334,709 A | * | 6/1982 | Akiyama et al. ....... 297/284.11 |
| 4,541,669 A | * | 9/1985 | Goldner ................. 297/284.11 |
| 4,717,203 A | | 1/1988 | Meiller |
| 4,773,703 A | * | 9/1988 | Krugener et al. ......... 297/284.1 |
| 4,915,447 A | | 4/1990 | Shovar |
| 5,171,062 A | | 12/1992 | Courtois |
| 6,106,063 A | * | 8/2000 | Dauphin ................. 297/284.11 |
| 6,419,317 B1 | * | 7/2002 | Westrich et al. ........ 297/284.11 |
| 6,454,353 B1 | * | 9/2002 | Knaus .................... 297/284.11 |

FOREIGN PATENT DOCUMENTS

| | | |
|---|---|---|
| DE | 3532608 C2 | 3/1987 |
| DE | 3929436 C2 | 9/1990 |
| DE | 4104442 C2 | 10/1991 |
| DE | 4038279 C2 | 6/1992 |
| DE | 4104697 A1 | 8/1992 |
| DE | 19754962 C1 | 5/1999 |
| DE | 29906108 U1 | 6/1999 |
| DE | 19801893 C2 | 7/1999 |
| DE | 19906621 C2 | 8/2000 |
| DE | 10113153 C1 | 4/2002 |
| DE | 19726680 C2 | 2/2003 |
| DE | 102004030363 A1 | 1/2006 |
| GB | 2252723 A | 8/1992 |
| WO | 2006000351 A1 | 1/2006 |
| WO | 2007090642 A1 | 8/2007 |

OTHER PUBLICATIONS

German Search Report, dated Jan. 23, 2009.

* cited by examiner

Primary Examiner—Milton Nelson, Jr.

(57) ABSTRACT

A seat which may be adjusted in its longitudinal direction, in particular a vehicle seat, contains a seat cushion with a front part and a rear part. The front part may be adjusted in the longitudinal direction of the seat and in its height relative to the rear part. The front part is guided for adjustment in two rails which are arranged obliquely to a seat surface of the rear part of the seat cushion.

8 Claims, 2 Drawing Sheets

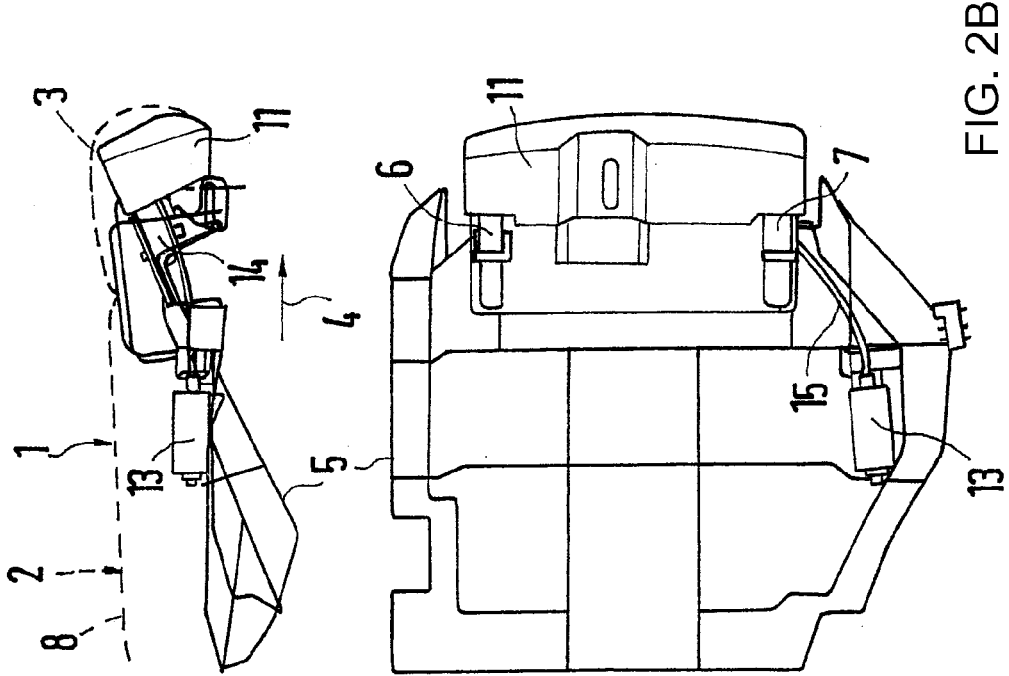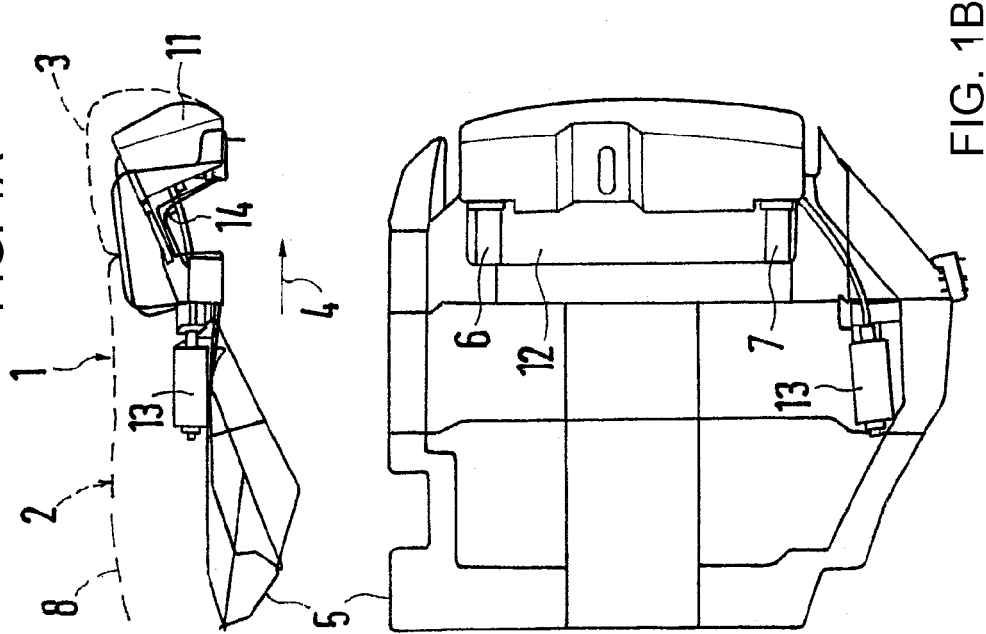

ADJUSTABLE SEAT

CROSS-REFERENCE TO RELATED APPLICATION

This application claims the priority, under 35 U.S.C. §119, of German application DE 10 2008 008 924.7, filed Feb. 7, 2008; the prior application is herewith incorporated by reference in its entirety.

BACKGROUND OF THE INVENTION

Field of the Invention

The present invention relates to a seat which may be adjusted in its longitudinal direction, in particular a vehicle seat, and contains a seat cushion having a front part and a rear part. The invention further relates to a motor vehicle equipped with such a seat.

A generic vehicle seat is known from German patent DE 41 04 442 C2, with a seat cushion containing a front part and a rear part, of which the front part may be adjusted in the longitudinal direction of the seat and in its inclination relative to the rear part. As the adjustable front part is forcibly coupled via a lever mechanism to the rear part, a longitudinal adjustment of the front part always takes place with a corresponding alteration of the inclination of the front part, whereby the seating comfort of the seat is intended to be advantageously increased.

A multi-adjustable device for a vehicle seat is known from German patent DE 199 06 621 C2 which contains a seat pan guided by a sliding link, which may be adjusted in height and inclination and which is mounted on a seat rail which is displaceable relative to a fixed guide rail. For adjusting the seat pan, front and rear control links are provided, which cooperate with bearing elements arranged on the seat pan. In this case, the rear control links are arranged opposite the front control links, as a result of which a horizontal compensation may take place during a longitudinal displacement of a rear bearing block carrying the rear control link.

A further adjustable motor vehicle seat is known from German patent DE 197 54 962 C1, which has the capacity for adjusting the seat height, the seat depth and the seat inclination. In this case, the seat positions are forcibly coupled to one another such that with a reduction of the seat height the seat inclination and the seat depth are increased at the same time and vice-versa. As a result, the individual adjusted positions are intended to be linked to one another via a mechanical coupling.

A motor vehicle seat with an adjustable seat depth is known from German patent DE 198 01 893 C2, which contains a one-piece seat cushion, which is mounted on a support and on the front edge thereof is pulled downward as a reserve seat depth. Also in this motor vehicle seat, the height adjustment of the seat is coupled to the seat depth adjustment so that when lowering the seat the seat depth is increased and vice versa.

Further motor vehicle seats are, for example, known from German patent DE 101 13 153 C, from German patent DE 40 38 279 C2, from U.S. Pat. No. 3,883,173, from German patent DE 35 32 608 C2, corresponding to U.S. Pat. No. 4,717,203, and from German patent DE 197 26 680 C2.

When designing motor vehicle seats, the problem is repeatedly posed that the motor vehicle seats have to be equally suitable for people of different sizes, and have to provide at least sufficient seating comfort for all these people. It is a fact in this connection that a seat user of large body size not only has long upper legs but also correspondingly long lower legs, so that it is generally advantageous if, when displacing the seat in the longitudinal direction, at the same time the inclination of a seat cushion is increased or reduced. As a result, in every case, i.e. with any body size of the respective seat user, the upper leg is securely supported flat on the seat cushion.

SUMMARY OF THE INVENTION

It is accordingly an object of the invention to provide an adjustable seat that overcomes the above-mentioned disadvantages of the prior art devices of this general type, which is an improved design for a generic seat, provides a high degree of seating comfort for people of different sizes, and has an adjusting mechanism which operates in a simple but reliable manner.

With the foregoing and other objects in view there is provided, in accordance with the invention, a seat. The seat contains a seat cushion adjustable in a longitudinal direction and has a front part and a rear part with a seat surface. The front part is adjusted in the longitudinal direction of the seat and in its height relative to the rear part. Two rails are disposed obliquely to the seat surface of the rear part. The front part is guided for adjustment in the two rails.

The invention is based on the general idea of configuring a seat cushion of a seat, which may be adjusted in its longitudinal direction, in at least two parts, namely a rear part and a front part which may be adjusted relative thereto. The front part during adjustment carries out a translatory movement, which moves the front part both away from the rear part and also alters the height of the front part, so that when extending the front part the height thereof increases and, as a result, the upper leg is always supported flat, even for larger people. Smaller people, however, sit in the same manner extremely comfortably on the seat according to the invention, as the front part is retracted with smaller people, i.e. directly bears against the rear part of the seat cushion, and therefore has the same height as the rear part of the seat cushion. The translatory adjusting movement is carried out by two rails, which are arranged obliquely to a seat surface of the rear part of the seat cushion, and in which the front part is guided so that, when adjusting the front part, the position thereof is forcibly altered in the X and Z-directions. The two rails in this case represent a structurally simple adjusting mechanism which operates reliably and which, moreover, ensures that the seat may be easily adapted to people of different sizes. With the seat according to the invention, therefore, a piece of seating furniture which is suitable in particular for vehicle seats may be provided, which may be easily adapted to almost any size of person sitting on the seat, and whereby also the driving safety may be increased, as the people sitting on the seat are always able to adopt a seating position which is optimal for driving.

In an advantageous development of the solution according to the invention, the rails for guiding the front part are inclined by approximately 10° relative to the seat surface of the rear part of the seat cushion. Such a setting angle of the rails for guiding the front part relative to the seat surface of the rear part allows an optimal adjusting movement of the front part relative to its longitudinal movement and its vertical movement. Such a setting angle has the effect, for example, that with a longitudinal adjustment of 50 mm to the front, the front part is raised upward at the same time by approximately 10 mm.

Expediently, an electrical drive device is provided which produces the adjusting movement of the front part via a gear mechanism, in particular via a gear mechanism arranged on a cross member. By such a gear mechanism, it is possible to keep the actual drive device, for example an electric motor, very small, as due to the gear ratio sufficient force is present which also allows an adjustment of the front part easily when a person is sitting on the seat.

In a further advantageous embodiment of the solution according to the invention, it is provided in this case that the drive device is either arranged on the cross member and directly drives the gear mechanism or that the drive device is arranged on a tubular frame of the seat and indirectly drives the gear mechanism via a flexible shaft. The latter option provides the greatest advantage in that the drive device required for driving the front part may be positioned elsewhere on the seat, in particular where a sufficiently large amount of constructional space is present. In this case, torque is able to be easily transmitted between the drive device and the gear mechanism by the flexible shaft which may be produced as a cost-effective component. A direct arrangement of the drive device on the cross member and/or on the gear mechanism provides, however, the advantage that the otherwise required flexible shaft may be dispensed with, whereby the large number of parts may be reduced and the storage and logistics costs may be lowered.

Preferred embodiments of the invention are shown in the drawings and are described in more detail in the following description, the same reference numerals referring to components which are the same or similar or functionally the same.

Other features which are considered as characteristic for the invention are set forth in the appended claims.

Although the invention is illustrated and described herein as embodied in an adjustable seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A is a diagrammatic, side view of a seat according to the invention with a retractable and extendable front part, the front part being illustrated in its retracted position;

FIG. 1B is a diagrammatic, plan view of the seat according to FIG. 1A;

FIG. 2A is a diagrammatic, side view as in FIG. 1A, but with a front part in an extended position;

FIG. 2B is a diagrammatic, plan view of the seat according to FIG. 1B but with the front part in the extended position.

DETAILED DESCRIPTION OF THE INVENTION

Figure 3:
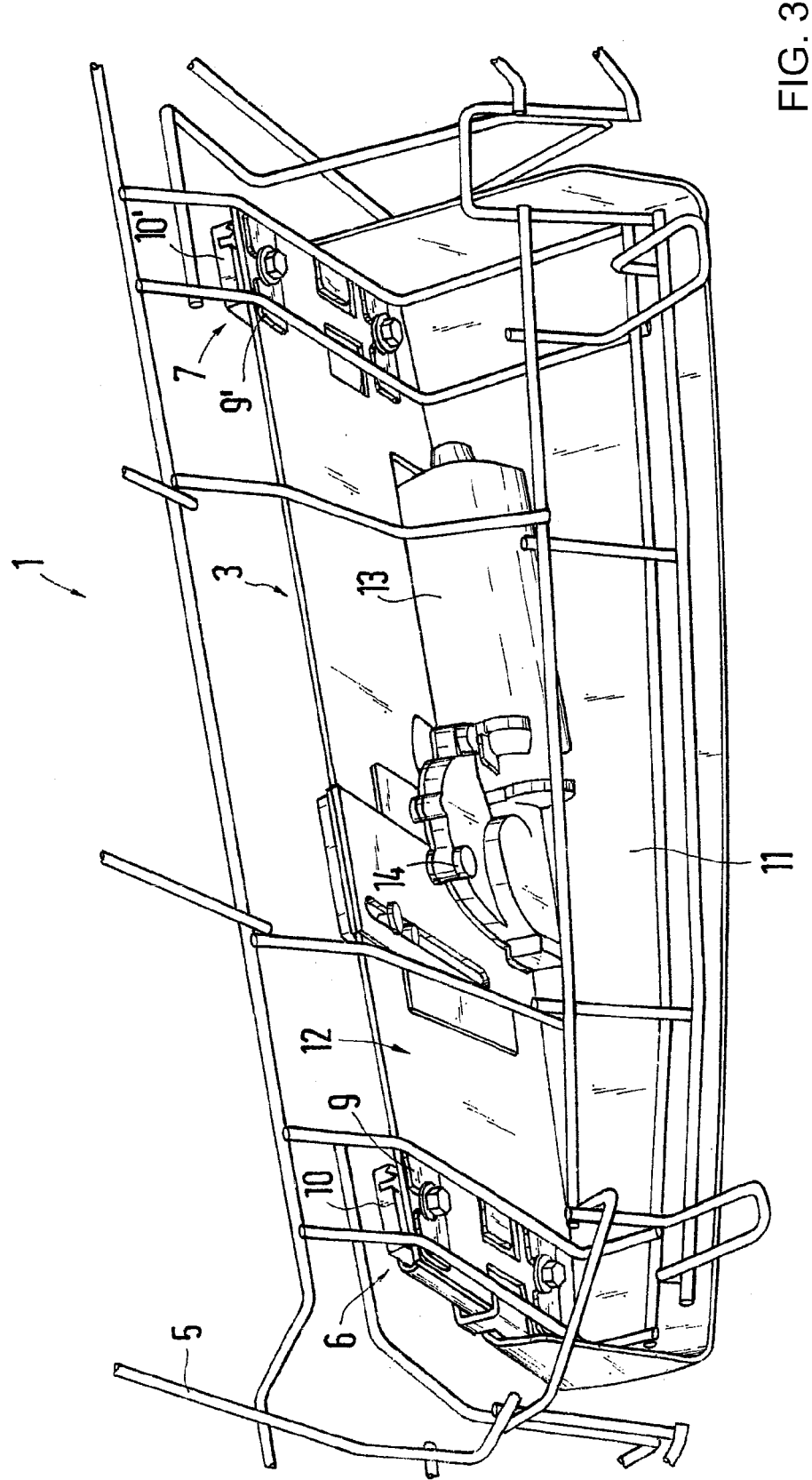
FIG. 3 is a diagrammatic, perspective view from below of the front part of the seat cushion which may be adjusted according to the invention.

Referring now to the figures of the drawing in detail and first, particularly, to FIG. 1 thereof, there is shown a seat cushion 1 of a vehicle seat, though not shown fully. The seat cushion 1 has a rear, preferably fixed part 2, as well as an adjustable front part 3. The front part 3 may be adjusted in a longitudinal direction of the seat 4 and in its height in a translatory manner relative to the rear part 2, in order to be able to adapt the vehicle seat to different sizes of people. Both the rear part 2 and the front part 3 of the seat cushion 1 are simply indicated according to FIGS. 1A and 2A by dotted lines, as the invention described below mainly refers to the adjusting kinematics, which might be concealed by a fully illustrated seat cushion.

A three-dimensional wire frame 5 underlies the seat cushion 1 as a supporting structure, which carries a cushion, not shown in more detail. If the seat is configured as a vehicle seat, a possibility for adapting the seat to different sizes of person sitting on the seat is imperative in order to be able to produce an optimal seating position and thus also increased driving safety. As people with larger body sizes not only have long upper legs but also correspondingly long lower legs, it is advantageous if with a displacement of the front part 3 in the longitudinal direction of the seat 4, at the same time also the vertical position of the front part 3 is adapted, in order to be able to ensure that the upper leg of the person sitting on the vehicle seat is securely supported flat on the front part 3. For this reason, the front part 3 of the seat cushion 1 may be adjusted in the longitudinal direction of the seat 4 and in its height relative to the rear part 2, in particular may be adjusted in a translatory manner, the front part 3 being guided for adjustment in two rails 6 and 7 (see FIGS. 2B and 3), which are arranged obliquely to a seat surface 8 of the rear part 2 of the seat cushion 1. Advantageously, the inclination of the rails 6 and 7 relative to a seat surface 8 of the rear part 2 of the seat cushion 1 is approximately 10°. Such an angle of inclination with an adjustment of the front part 3 in the longitudinal direction of the seat 4 by approximately 50 mm causes a lifting of the front part 3 in the Z-direction by approximately 10 mm. The angle of inclination is in this case adapted to the anatomical features of different sizes of person, so that both small and large people may sit comfortably for a lengthy period of time on the vehicle seat according to the invention.

When observing FIG. 3, in the region of the front part 3 a plate-like cross member 12 is seen, on which one respective rail lower part 9 and 9' of the two rails 6 and 7 is arranged, while one respective corresponding rail upper part 10 and 10' is arranged on a support element 11 bearing the front part 3. In order to be able to increase the ease of operation of the adjustable seat, an electrical drive device 13 is provided which drives a gear mechanism 14 arranged on the cross member 12, effecting the adjusting movement of the front part 3. The gear mechanism 14 in this case translates a rotational movement of the shaft of the electrical drive device 13 and thus also allows an adjustment of the front part 3 with a person sitting on the seat cushion 1. In this case, the drive device 13, in principle, as is shown in FIG. 3, may be arranged on the cross member 12 and drive the gear mechanism 14 directly or, however, the drive device 13 is arranged on a tubular frame, in particular on the wire frame 5, and drives the gear mechanism 14 indirectly via a flexible shaft 15, as is shown for example in FIGS. 1B and 2B. The latter embodiment has the advantage that the drive device 13 may be arranged at almost any point of the seat, while a direct arrangement of the drive device 13 on the cross member 12 provides the advantage that the flexible shaft 15 may be dispensed with.

In order to be able to transmit the drive force originating from the gear mechanism 14 to the front part 3, a gear output acts via a gear wheel on a gear rack, which is arranged on the support element 11 bearing the front part 3. Generally, instead of the electrical drive device, as is illustrated in FIGS. 1A to 3, naturally also a pneumatic or hydraulic adjusting device may be provided.

So that both in the retracted and extended position of the front part 3, an optimal visual appearance is provided, a cover of the seat cushion 1 is provided with a fold of the cover extending between the adjustable front part 3 and the rear part 2 of the seat cushion 1 in the transverse direction of the seat, which tightly covers a gap between the front part 3 and the rear part 2 in all adjusted states. In this case, it may also be provided that a covering fabric and/or a covering material is resiliently configured in the region of the gap between the front part 3 and the rear part 2.

By the seat cushion 1 according to the invention, a more comfortable seat for people of different sizes may be provided which is able to be adapted easily to the respective size of the person sitting thereon due to its front part 3 which is adjustable in a translatory manner relative to the longitudinal direction of the seat 4 and the height thereof. As a result, an optimal seating position of the person sitting on the seat cushion 1 may always be achieved, which is in particular of great advantage in the case where the seat is configured as a vehicle seat and an optimal seating position has a direct effect on driving safety.

The invention claimed is:

1. A seat, comprising:
    a seat cushion adjustable in a longitudinal direction and having a front part and a rear part with a seat surface, said front part being adjusted in the longitudinal direction of the seat and in its height relative to said rear part; and
    two rails disposed obliquely to said seat surface of said rear part, said front part being guided for adjustment on said two rails;
    rail lower parts supported by said rails;
    rail upper parts;
    a support element bearing said front part and on which said rail upper parts are disposed;
    a cross member on which said rail lower parts are disposed;
    a gear mechanism disposed on said cross member; and
    an electrical drive device driving said gear mechanism, effecting an adjusting movement of said front part.

2. The seat according to claim 1, wherein said rails for guiding said front part are inclined by approximately 10° from said seat surface of said rear part of said seat cushion.

3. The seat according to claim 1, wherein the seat is a vehicle seat of a motor vehicle.

4. The seat according to claim 1, further comprising:
    a flexible shaft; and
    a tubular frame, said electric drive device is disposed on said tubular frame and indirectly drives said gear mechanism via said flexible shaft.

5. The seat according to claim 1, wherein said electric drive device is disposed on said cross member and directly drives said gear mechanism.

6. The seat according to claim 1, wherein said front part is adjusted in an extended position by approximately 50 mm to a front and by approximately 10 mm upward.

7. A seat, comprising:
    a seat cushion adjustable in a longitudinal direction and having a front part and a rear part with a seat surface, said front part being adjusted in the longitudinal direction of the seat and in its height relative to said rear part; and
    two rails disposed obliquely to said seat surface of said rear part, said front part being guided for adjustment on said two rails;
    rail lower parts supported by said rails;
    rail upper parts;
    a support element bearing said front part and on which said rail upper parts are disposed;
    a cross member on which said rail lower parts are disposed;
    a gear wheel;
    a gear rack disposed on said support element bearing said front part; and
    a gear output acting via said gear wheel on said gear rack.

8. A motor vehicle, comprising:
    a seat, containing:
        a seat cushion adjustable in a longitudinal direction and having a front part and a rear part with a seat surface, said front part being adjusted in the longitudinal direction of the seat and in its height relative to said rear part; and
        two rails disposed obliquely to said seat surface of said rear part, said front part being guided for adjustment on said two rails;
        rail lower parts supported by said rails;
        rail upper parts;
        a support element bearing said front part and on which said rail upper parts are disposed;
        a cross member on which said rail lower parts are disposed;
        a gear mechanism disposed on said cross member; and
        an electrical drive device driving said gear mechanism, effecting an adjusting movement of said front part.

* * * * *